Oct. 8, 1968   A. K. SCHOTT   3,404,575
POSITIONING MECHANISM
Filed Oct. 23, 1965   2 Sheets-Sheet 2
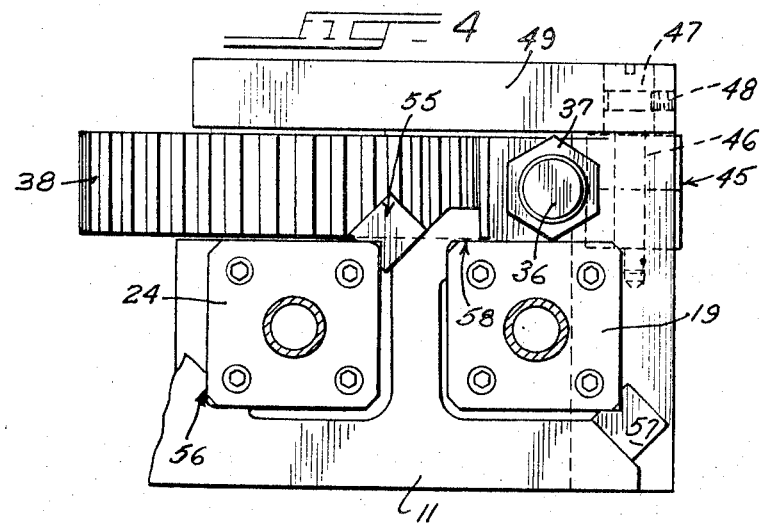
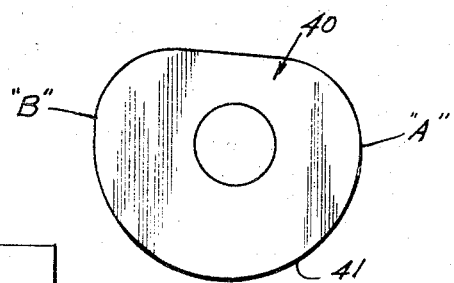
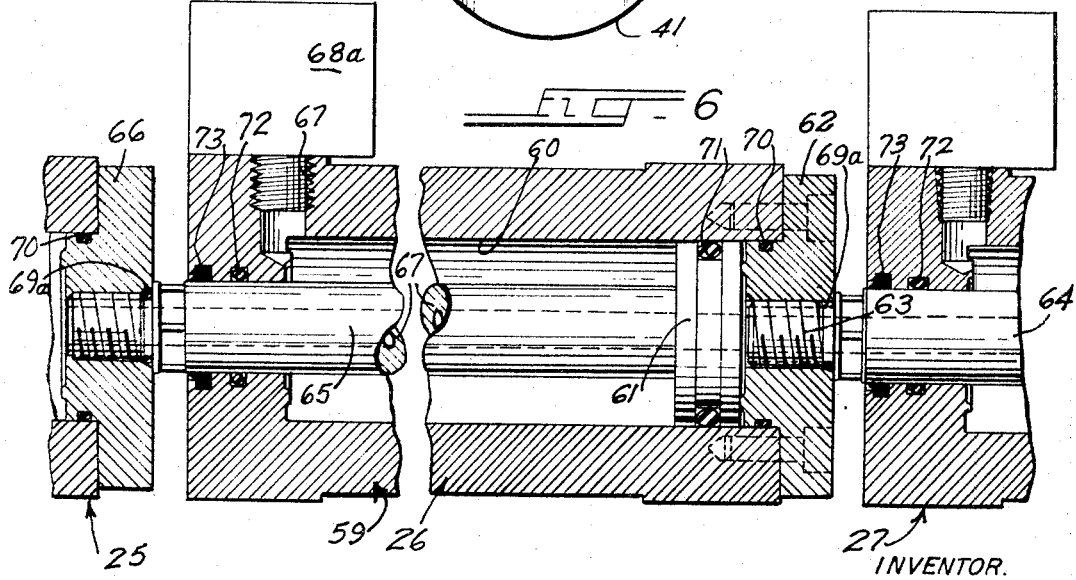
INVENTOR.
ARTHUR K. SCHOTT United States Patent Office 3,404,575
Patented Oct. 8, 1968

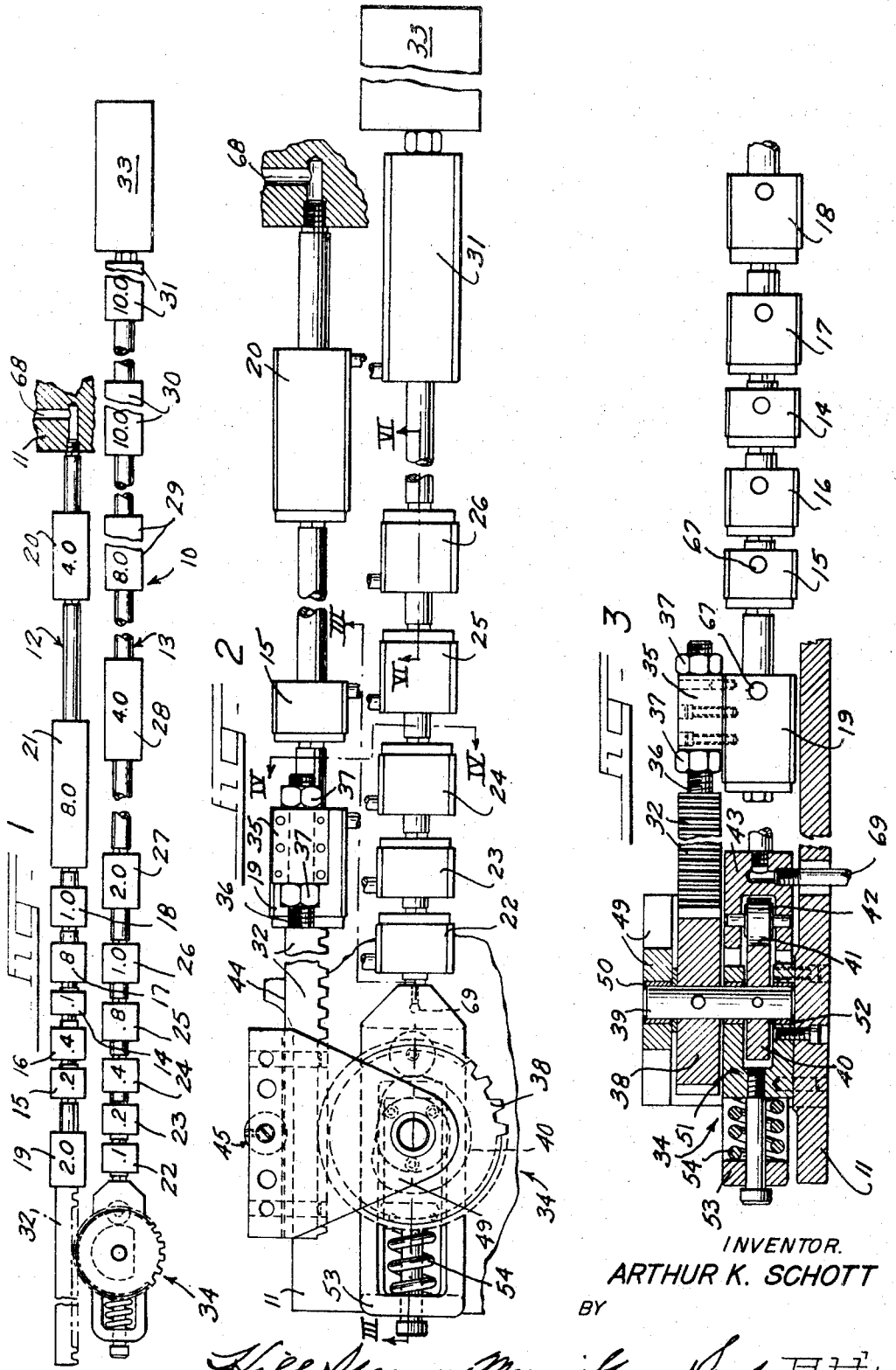

3,404,575
POSITIONING MECHANISM
Arthur K. Schott, Clarence, N.Y., assignor to Houdaille Industries, Inc., Buffalo, N.Y., a corporation of Michigan
Filed Oct. 23, 1965, Ser. No. 503,937
14 Claims. (Cl. 74—110)

ABSTRACT OF THE DISCLOSURE

A set of digitally actuatable fluid actuators are connected together in mechanical series to drive a rack. The rack drives a gear which rotates a cam. The cam has a rise or radius change which is 1/100 of the pitch diameter of the gear, and such cam therefore shifts a second similar set of fluid actuators by a distance equal to 1/100 of the travel of the rack.

This invention relates generally to fluid-actuated positioning means, and more specifically to apparatus adapted to effect digital positioning of one element with respect to another.

Although the principles of the present invention may be included in various devices, a particularly useful application is made in a machine tool wherein one element, such as a workpiece, is to be successively positioned in numerous positions relative to a second element or reference point, such as a tool disposed at a fixed location.

The present invention contemplates the utilization of a considerable number of fluid actuators which are individually actuated from one limit of travel to the other, and any combination of which fluid actuators may be jointly actuated, such actuators being mechanically connected together so that the element to be positioned is moved by an amount which is the sum of the travels of certain of the actuated acutators. Further, to minimize the number of styles of actuator required, and to provide extremely accurate small displacements, means are provided by which the actual movement of certain actuators is reduced by a predetermined fraction to provide a somewhat smaller effective movement, such as 1/100 of the original movement.

Accordingly, it is an object of the present invention to provide a novel fluid-actuated positioning means.

Another object of the present invention is to provide fluid actuated means which may be employed to effect selected digital movements of an element such as a workpiece.

Yet another object of the present invention is to provide a positioning mechanism wherein the actual movements are reduced by a predetermined fraction, such as 1/100, to produce an effective smaller movement.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is a plan view, partially broken away, of a fluid-actuated positioning system provided in accordance with the principles of the present invention;

FIG. 2 is an enlarged view of certain portions of FIG. 1;

FIG. 3 is a cross-sectional view, with certain parts in elevation, taken along line III—III of FIG. 2;

FIG. 4 is an enlarged view taken along line IV—IV of FIG. 2;

FIG. 5 is a plan view of an element shown in dashed lines in FIG. 2; and

FIG. 6 is an enlarged cross-sectional view taken along line VI—VI of FIG. 2.

As shown on the drawings:

The principles of this invention are particularly useful when embodied in a fluid-actuated positioning mechanism or system such as illustrated in FIG. 1, generally indicated by the numeral 10. The mechanism 10 includes a fixed support and guide means 11, best seen in FIG. 4, on which there is supported and guided various fluid actuators. The guide means 11 is termed "fixed" as a means of reference and may be a movable "fixed" reference in the sense that the entire positioning mechanism may be transported from position to position.

The actuator means includes a first set of linear fluid actuators generally indicated at 12 and a second set of linear fluid actuators generally indicated at 13. The first set of actuators 12 may also be referred to as an auxiliary cylinder train, while the second set 13 may be referred to as a main cylinder train. All of the actuators which make up the first or auxiliary set 12 are connected together mechanically in series as illustrated in FIG. 1, while all of the actuators that make up the second or main cylinder train are likewise connected mechanically together in series as illustrated in both FIG. 1 and FIG. 6. The first set of actuators 12 is made up of eight actuators arranged in any sequence and including a first group made up of actuators identified by reference numerals 14–17, and a second group identified by reference numerals 18–21. Likewise, the second set or main set of actuators 13 is made up of at least two groups of actuators arranged in any sequence including a first group defined by actuators having reference numerals 22–25 and a second group defined by actuators having reference numerals 26–29. The actuators 14–17 are identical to the actuators 22–25, and the actuators 18–21 are identical to the actuators 26–29. Each actuator 14–29, when actuated, is caused to move to the extent of its full travel. Each actuator is precisely constructed to have exactly a predetermined travel. The actuators within each group 14–17, 18–21, 22–25 and 26–29 respectively have individual full travels which are integral multiples of the shortest of such full travels of the individual actuators comprising each such group. Thus, taking the group 14–17 as an example, the actuators 15, 16 and 17 have travels of .2, .4 and .8 unit, each of which is an exact integral multiple of the travel of .1 unit which the actuator 14 has, the actuator 14 having the shortest full travel in group 14–17. These four full travels within each group are such as to jointly and severally produce all single digit integral multiples of such shortest full travel. For example, the actuators 14–16 jointly have a combined travel of .7 unit, which is an exact single-digit multiple of the travel of the actuator 14. Thus the travels may be on the order or ratio of 1 to 2 to 4 to 8. The shortest full travel in one group 14–17 of one set 12 is that of the actuator 14, and its travel is identical to the shortest full travel in one group 22–25 of the other set 13, and is thus identical to the travel of the actuator 22. Likewise, the shortest full travel of the actuator 18 is identical to the shortest full travel of the actuator 26. Further, the travel of the actuators 18 and 26 is ten times as great as that of the actuators 14, 22.

When all of the actuators in the auxiliary set 12 are retracted, it may be said that the travel is zero, such being a starting or reference point. When the travels in a particular unit of length, such as inches, correspond numerically to the ratios of the travels indicated on the actuators of the first set 12, the maximum needed or full travel to be used becomes 9.9 inches. Depending upon which actuator or actuators are energized, all travels in increments of 0.1 inch between 0 and 9.9 inches may thus readily be obtained. (In reality, even greater travels for a total of 16.5 inches could be obtained, but are not utilized normally since distances will be expressed in terms of base 10 numbers.)

Since the actuators in the second set 13 include actuators which have travels identical to those of the first set 12, the second set may also produce travels ranging from 0 to 9.9 inches. However, in the second set 13, there are provided such additional actuators as may be desired to increase this range. In the present embodiment, it has been deemed sufficient to extend the range by 20 inches, and therefore two 10-inch actuators 30, 31 are sufficient to extend the range to 30 inches.

The first or auxiliary set of actuators has one end which is a fixed portion which is accomplished by attaching the piston rod of the actuator 20 to the fixed support and guide means 11. The opposite end of the first set of actuators 12 constitutes a movable portion thereof to which there is attached a rack 32. When each of the actuators 14-21 is extended, the movable portion moves away from the fixed portion 11, and when such actuators 14-21 are retracted, the movable portion is driven toward the fixed portion 11.

The second or main set of actuators 13 has one end that is adapted to be secured mechanically to an element 33 which is to be linearly positioned with respect to the fixed portion 11, the element 33 here representing a workpiece on which a machine tool is to perform an operation. When any of the actuators 22-31 is extended, it is caused to move in a direction opposite to that of the first or auxiliary set 12. Conversely, on being retracted, the movement again is in the opposite direction. The first set 12 is disposed in a preferred embodiment to lie parallel to the second set 13, and the movable portion of the first set is connected to drive an end of the second set which is opposite to the element 33, and which is adjacent to such movable portion. To this end, there are means provided which are generally indicated at 34 which receive input movements from the movable portion of the first actuator means 12, which means 34 convert such input movements into output movements in the opposite direction, and which output movements are a predetermined fraction of the input movements, and which means are so constructed as to direct such output movements onto such opposite end of the actuator means 13. The predetermined fraction in this embodiment is $\frac{1}{100}$. The means 34 includes the rack 32 and divides its movement by 100.

The detailed structure of the means 34 is illustrated more fully in FIGS. 2 and 3. The actuator 19 has a piston rod that is connected to the actuator 15, so that when the actuator 19 is powered fluidly, its cylinder moves in one direction or the other. Such movement is transmitted to a connecting block 35 which is bolted and pinned to the actuator 19 for movement with its cylinder. The connecting block 35 has a longitudinal bore through which a threaded extension 36 of the rack 32 extends. The threaded extension 36 is held in a predetermined position, by a pair of jam nuts 37, 37 carried by such extension 36 and acting against opposite faces of the connecting block 35. The rack 32 has teeth which mesh with the teeth of a rotatably supported gear or pinion 38. The gear 38 is pinned to and rotatably supported by a shaft 39 for movement about its axis. Also pinned to the shaft 39 is a cam 40 which has a peripheral surface which constitutes a cam track 41 which engages a rotatable follower 42 carried by a yoke 43 which is secured to the end of the actuator set 13 which is opposite to the element 33.

The rack 32 has a straight surface 44 which faces away from the gear 38, the surface 44 being engaged by a backup member 45. In this embodiment, the backup member 45 constitutes a pair of rotatable followers or rollers which are carried on an eccentric portion 46 of an eccentric pin 47. The eccentric pin is slotted at its upper end to enable rotation thereof to a selected position which is locked by tightening of a setscrew 48. Proper adjustment of the eccentric pin 47 assures minimum backlash between the teeth of the gear 38 and the rack 32. Any remaining backlash is divided by 100 by the means 34 as explained below, so as to produce an entirely negligible effect on the position of the element or workpiece 33. The eccentric pin 47 is fixedly carried by the fixed support and guide means 11 which includes a support arm 49 which overhangs the rotational axis of the gear 38 and cam 40.

The overhanging portion 49 is apertured as shown in FIGS. 2 and 3 and receives bearing means 50 which support the upper end of the cam and pinion shaft 39. A bearing block 51 is secured to the support and guide means 11, and is apertured to receive further bearing means 52 which support the central and lower end of the cam and pinion shaft 39. Thus the gear 38 and the cam 40 are corotatable about a fixed support axis in response to reciprocation of the rack 32.

The cam 40 is illustrated alone in FIG. 5, and its profile is explained in this paragraph. For purpose of such illustration, it will be assumed that the full used travel of the actuator set 12 ranges from 0 to 9.9 inches, and that the cam track 41 is to divide this movement by 100. For a travel of 9.9 inches of the rack 32, a point on the pitch diameter of the gear 38 is caused to move a corresponding distance, but in an arc. The ends of such arc, extended to the center of rotation, define a subtended arc on the cam periphery 41 which in this embodiment corresponds to 190°. Stated otherwise, the cam track 41 is engaged at point A when the actuator set 12 is at one extreme position, and the cam track 41 is engaged at a point B when the actuator set 12 is at its opposite extreme position. In order to divide by 100, the radius of the cam from its center of rotation to the point A may be any convenient value, and such radius increases at a uniform rate along the extent of the cam track 41 so that point B is 0.099 inch higher than is point A. Thus the useful peripheral portion of the cam track 41 has a uniform rise which is at its maximum $\frac{1}{100}$ of the full travel of the actuators which drive it.

The cam track 41 is engaged by the follower 42 which is rotatably supported by the yoke 43. The yoke 43 constitutes a hollow frame which extends about the rotational or support axis of the cam 40. The hollow frame or yoke 43 thus has a central opening which receives the block 51, and the yoke is suitably undercut and slotted where required to be clear of the cam 40 and to receive and support the rotatable follower 42. The yoke 43 has an end portion 53, against which a spring 54 acts. The spring 54 acts between the block 51 and such end portion 53 and comprises means yieldably biasing the end of the main cylinder train 13 against the cam track 41.

When the rack 32 is shifted axially, it rotates the gear 38 by a corresponding angle. As the cam 40 is corotatable with the gear 38, the cam track 41 is rotated by such corresponding angle. As the element or workpiece 33 is secured by the second set of actuators 13 and the yoke 43 to the cam follower 42, and as the cam follower 42 is always biased against the track 41 by the spring 54, the element or workpiece 33 will be shifted by the amount of slope that the cam 40 has on its track 41 within such corresponding angle.

The various actuators 14-31 have cylinders which are of generally square cross section as best shown in FIG. 4. The fixed support and guide means 11 has a pair of gib means 55, 56 and 57, 58 which are fixed with respect to the rigid support and guide means 11, and which are disposed diagonally from each other and which slidably engage two adjacent sides of each of the actuators 14-31. The gibs 55 and 57 are adjustable so that a close sliding fit is produced. By such an elongated structure, all of the cylinders of all of the actuators are movably supported.

In FIG. 6, there is illustrated three actuators connected in mechanical series in the manner of actuators 25-27, the actuator 26 being somewhat enlarged in the nature of the actuator 29 for convenience of illustration. Each of the actuators includes a cylinder body 59 which has a circular internal bore 60 which slidably receives and supports a piston 61. The bore 60 is closed by a forward cylinder head or cap 62 which has an aperture that threadedly receives the projecting end 63 of the piston rod 64 of the actuator 27. The opposite end of the cylinder body 59 is apertured and through this aperture, a piston rod 65 secured to the piston 61 projects and is similarly secured to the cap 66 of the actuator 25. Each piston rod is hollow and thus has a bore 67. Pressurized fluid enters a port 68 (FIG. 1 or 2) in the instance of the actuator set 12. Fluid pressure enters through a line 69 in the instance of the actuator set 13. Pressurized fluid thus passes through the hollow piston rod and through the hollow piston to pressurize the side of the piston adjacent to the cap 62, and pressurized fluid thus also flows through such cap and through the piston rod 64 of the next succeeding actuator. The cylinder bodies 59 are provided with a port 67 which is receptive of a suitable pressure fitting or valve 68a, each forming part of a hydraulic control system of a known type (not shown) and which controls admission of fluid individually to the opposite sides of the various pistons 61, namely directly to the rod-sides thereof, and thus indirectly to the other sides thereof. The pressurized fluid which enters the ports 68 and 69 tends to move all the actuators 14–31 to a fully extended position, but none can so move until its individual port 67 is opened to enable fluid drainage from the adjacent side of each piston. Each extended actuator is retracted by the application of pressurized fluid to the port 67. Obviously, such pressure must be higher than that acting on the other larger sides of the piston 61 to overcome the bias provided by the pressure at the port 68 or 69. An O-ring 69a seals the connection between the piston rod 65 or 64 and the cylinder cap 66 or 62. An O-ring 70 seals the connection between each cap 66 or 62 and the associated body 59. An O-ring 71 is carried by each piston 61 to seal the opposite sides thereof from each other. An O-ring 72 seals the cylinder body 59 against leakage along the piston rod 65. A wiper 73 is employed to keep the piston rods 65, 64 clean, thereby protecting the O-ring 72.

In operation, the element 33 is digitally positioned to various positions with respect to a zero reference wherein such positions are directly established by the actuators 14–31. The actuators 30 and 31 define the digits in the tens column of the dimension. The actuators 26–29 define the digits in the units column of the dimension. The hundred thousandths (i.e., tenths) digits in the dimensions are provided by the actuators 22–25. The tens of thousandths (i.e., hundredths) digits in the dimensions are provided by the actuators 18–21, and the thousandths digits in the dimensions are directly provided by the actuators 14–17, the actual movement of the actuators 14–21 being 100 times as great as the portion of the dimension provided by them. The composite movement of the actuators comprising the auxiliary train 12 is received by the means 34, is reduced by a predetermined fraction, and is imparted to the end of the actuator set 13 to move such set 13 by a precise amount which in this example is smaller than the travel of the actuator 22.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A mechanism for positioning an element, comprising:
   (a) linear fluid actuator means having a fixedly supported portion and a movable portion;
   (b) a group of individually actuatable linear fluid actuators mechanically connected together in series, one end of said group being adapted to be coupled to the element for moving it in a straight line, and an opposite end; and
   (c) means driven by said movable portion and connected to said opposite end and operative to transmit $\frac{1}{100}$ of the movement of said actuator means to said opposite end.

2. A mechanism for positioning an element, comprising:
   (a) a first set of actuators and a second set of actuators, each of said sets comprising two groups of fluid actuators mechanically connected together in one series per set, each of said groups consisting of four individually actuatable fluid actuators;
   (b) the actuators within each group respectively having individual full travels which are integral multiples of the shortest of such full travels of such group, such four full travels being such as to jointly and severally produce all single digit integral multiples of such shortest full travel, the shortest full travel in one group of one set being identical to the shortest full travel in one group in the other set, and the shortest full travel in the other group of said one set being ten times as large and being identical to the shortest full travel in the other group in said other set;
   (c) one end of one set being fixedly supported and its other end being movable, the other set having one end adapted to be coupled to the element for moving it in a straight line, and an opposite end; and
   (d) means driven by said movable end of said one set and connected to said opposite end of said other set, and operative to move said opposite end in response to any combination of actuator movements in said one set by an amount which is $\frac{1}{100}$ of such actuator movements.

3. A mechanism for positioning an element, comprising:
   (a) first linear fluid actuator means having a fixedly supported portion, and a movable portion movable in response to extension of said actuator in a direction away from said fixedly supported portion;
   (b) second linear fluid actuator means extending parallel to said first actuator means and having one end adapted to be coupled to the element and movable in a direction opposite to said direction in response to extension of said second actuator means, and having an opposite end; and
   (c) means (1) receiving input movements from said movable portion of said first actuator means, (2) converting such input movements into output movements in the opposite direction which are a predetermined fraction of the input movements, and (3) directing such output movements onto said opposite end.

4. A mechanism for positioning an element, comprising:
   (a) first linear fluid actuator means having a fixedly supported portion and a movable portion;
   (b) second linear fluid actuator means having an end adapted to be coupled to the element, and having an opposite end;
   (c) a rack secured to said movable portion to be reciprocated thereby;
   (d) a rotatably supported gear driven by said rack for movement about its support axis; and
   (e) a cam secured to said gear for movement therewith, and having a cam track disposed at a changing distance from said support axis and drivably engaging said opposite end of said second actuator means.

5. A positioning mechanism in accordance with claim 4 including means yieldably biasing said opposite end of said second actuator means against said cam track.

6. A positioning mechanism in accordance with claim 4, (a) said rack having a straight surface facing in a direction away from said gear; and (b) a backup member engaging said straight surface.

7. A positioning mechanism in accordance with claim 6 in which said backup member is a rotatable follower.

8. A positioning mechanism in accordance with claim 7 in which said follower is supported by means enabling adjustment of its rotational axis toward and away from said straight surface.

9. A positioning mechanism in accordance with claim 4 wherein said opposite end of said second actuator means supports a rotatable follower which engages said cam track.

10. A positioning mechanism in accordance with claim 4, including a hollow frame secured to said opposite end of said second actuator means, and having a follower engaged by said cam track, said frame extending about the rotational axis of said gear and said cam, and having an end portion opposite to said follower, said end portion being engaged by a spring which urges said follower against said cam track.

11. A mechanism for positioning an element, comprising:
   (a) first linear fluid actuator means having a fixedly supported portion and a movable portion;
   (b) second linear fluid actuator means having an end adapted to be coupled to the element, and having an opposite end; and
   (c) a rotatably supported cam, rotatable about its support axis and having means for rotating it in response to movement of said movable portion, said cam having a cam track drivably engaging said opposite end of said second actuator means.

12. A positioning mechanism in accordance with claim 11, said track having a portion with a peripheral extent that is engaged in response to the full travel of said first actuator means, and said track portion having a uniform rise corresponding to a predetermined fraction of said full travel.

13. A positioning mechanism in accordance with claim 12, in which said track has a uniform rise corresponding to $1/100$ of said full travel.

14. A positioning mechanism in accordance with claim 11, in which at least one of said fluid actuator means includes a movable cylinder of generally square cross-section, and a pair of longitudinally extending gib means fixedly supported with respect to said fixedly supported portion, and disposed diagonally from each other and each slidably engaging two sides of said movable cylinder.

References Cited

UNITED STATES PATENTS

| | | | |
|---|---|---|---|
| 2,684,017 | 7/1954 | Schafer | 77—33.5 X |
| 2,733,691 | 2/1956 | Johnson | 77—32 X |
| 2,740,258 | 4/1956 | Weber | 77—33.5 X |
| 2,873,630 | 2/1959 | Eschenburg et al. | 77—33.5 |
| 3,071,028 | 1/1963 | Wagner | 77—3 |

C. J. HUSAR, *Primary Examiner.*